(12) United States Patent
Zhang

(10) Patent No.: US 10,666,072 B2
(45) Date of Patent: May 26, 2020

(54) POWER ADAPTER AND METHOD FOR HANDLING IMPEDANCE ANOMALY IN CHARGING LOOP

(71) Applicant: GUANGDONG OPPO MOBILE TELECOMMUNICATIONS CORP., LTD., Guangdong, Dongguan (CN)

(72) Inventor: Jialiang Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/151,021

(22) Filed: Oct. 3, 2018

(65) Prior Publication Data

US 2019/0036361 A1 Jan. 31, 2019

Related U.S. Application Data

(63) Continuation of application No. 15/115,078, filed as application No. PCT/CN2015/070461 on Jan. 9, 2015, now Pat. No. 10,122,190.

(30) Foreign Application Priority Data

Jan. 28, 2014 (CN) .......................... 2014 1 0042716
Jan. 28, 2014 (CN) .......................... 2014 1 0043148

(51) Int. Cl.
*H02J 7/00* (2006.01)
*H02J 7/02* (2016.01)
*H01R 31/06* (2006.01)

(52) U.S. Cl.
CPC ............ *H02J 7/0029* (2013.01); *H01R 31/06* (2013.01); *H02J 7/007* (2013.01); *H02J 7/00036* (2020.01);
(Continued)

(58) Field of Classification Search
CPC ...... H02J 7/0029; H02J 7/0004; H02J 7/0057; H02J 7/007; H02J 7/02; H02J 7/0047;
(Continued)

(56) References Cited

U.S. PATENT DOCUMENTS 6,018,703 A * 1/2000 Dodd ................... G05B 13/024
330/278
7,649,550 B2 * 1/2010 Ishiyama ........... H04N 5/23203
348/211.14
(Continued)

FOREIGN PATENT DOCUMENTS

CN        1163500 A      10/1997
CN       101013764 A      8/2007
(Continued)

OTHER PUBLICATIONS

Japanese Patent Application No. 2018-116177, Office Action dated Apr. 16, 2019, 5 pages.
(Continued)

*Primary Examiner* — M Baye Diao
(74) *Attorney, Agent, or Firm* — Lathrop GPM LLP

(57) ABSTRACT

A power adapter and a method for handling an impedance anomaly in a charging loop are provided. The power adapter includes a power conversion unit and a charging interface. The power conversion unit forms a charging loop with a terminal through the charging interface. The power adapter includes a communications unit, a detection unit, and an anomaly handling unit. The communications unit is configured to receive voltage indicative information from the terminal, the voltage indicative information indicating an input voltage of the terminal. The detection unit is configured to detect an output voltage of the power adapter. The anomaly handling unit is configured to determine whether an impedance of the charging loop is abnormal according to a difference between the input voltage and the output voltage,
(Continued)

and to control the charging loop to enter into a protection state if the impedance of the charging loop is abnormal.

20 Claims, 5 Drawing Sheets

(52) U.S. Cl.
CPC ............ *H02J 7/0069* (2020.01); *H02J 7/02* (2013.01); *H02J 7/00034* (2020.01); *H02J 7/0047* (2013.01)

(58) Field of Classification Search
CPC ...... H02J 2007/0096; H02J 2007/0039; H01R 31/06; G01R 31/382; G01R 19/16571; H04M 1/0262; H04M 2201/34; H04M 2001/0204
USPC ........................................................ 320/107
See application file for complete search history.

(56) References Cited

U.S. PATENT DOCUMENTS

| | | | | |
|---|---|---|---|---|
| 7,737,590 B2* | 6/2010 | Oyama | ............... | F16C 32/0444 |
| | | | | 310/68 B |
| 8,064,513 B2* | 11/2011 | Yamazaki | ................ | H03K 3/64 |
| | | | | 370/311 |
| 9,337,919 B2* | 5/2016 | Kikuchi | .................. | H01P 5/188 |
| 9,825,348 B2* | 11/2017 | Kikuchi | .................. | H01P 1/208 |
| 2004/0090209 A1* | 5/2004 | Nishida | ................. | H02J 7/0071 |
| | | | | 320/149 |
| 2004/0100271 A1 | 5/2004 | Ikeda | | |
| 2004/0108843 A1* | 6/2004 | Lanni | ........................ | G05F 1/56 |
| | | | | 323/271 |
| 2005/0174094 A1* | 8/2005 | Purdy | ...................... | H02J 7/00 |
| | | | | 320/134 |
| 2006/0284595 A1* | 12/2006 | Hsieh | .................... | H02J 7/0077 |
| | | | | 320/115 |
| 2010/0077237 A1* | 3/2010 | Sawyers | .................... | G06F 1/26 |
| | | | | 713/300 |
| 2011/0248670 A1* | 10/2011 | Yamazaki | ......... | H01M 10/0585 |
| | | | | 320/107 |
| 2012/0253715 A1 | 10/2012 | Ohtomo | | |
| 2012/0268074 A1* | 10/2012 | Cooley | .................. | H01G 11/58 |
| | | | | 320/130 |
| 2013/0175978 A1* | 7/2013 | Hsiao | ........................ | H02J 7/02 |
| | | | | 320/107 |
| 2016/0336767 A1* | 11/2016 | Zane | ....................... | H02J 1/102 |

FOREIGN PATENT DOCUMENTS

| | | |
|---|---|---|
| CN | 101363895 A | 2/2009 |
| CN | 201335870 Y | 10/2009 |
| CN | 102395892 A | 3/2012 |
| CN | 102481858 A | 5/2012 |
| CN | 102508096 A | 6/2012 |
| CN | 103477529 A | 12/2013 |
| EP | 2701267 A1 | 2/2014 |
| JP | 2007327772 A | 12/2007 |
| JP | 2009195074 A | 8/2009 |
| JP | 2009225493 A | 10/2009 |
| JP | 2010220299 A | 9/2010 |
| JP | 2011015581 A | 1/2011 |
| JP | 4960022 B2 | 6/2012 |
| JP | 2013088951 A | 5/2013 |
| JP | 2013108793 A | 6/2013 |
| JP | 2013153595 A | 8/2013 |
| WO | WO 2012144032 A1 | 10/2012 |

OTHER PUBLICATIONS

Indian Patent Application No. 201637028718 Office Action dated Jan. 11, 2019, 5 pages.
European Patent Application No. 18207105.0 extended Search and Opinion dated Mar. 26, 2019, 5 pages.
PCT/CN2015/070461 International Search Report and Written Opinion dated Mar. 27, 2015, 13 pages.
PCT/CN2015/070461 English translation of International Search Report and Written Opinion dated Mar. 27, 2015, 12 pages.
Chinese Patent Application No. 201580005413.1 Office Action dated Jul. 10, 2017, 6 pages.
Chinese Patent Application No. 201580005413.1 English translation of Office Action dated Jul. 10, 2017, 10 pages.
Korean Patent Application No. 10-2016-7023552 English translation of Office Action dated Dec. 14, 2018, 5 pages.
Korean Patent Application No. 10-2016-7023552 Office Action dated Dec. 14, 2018, 6 pages.
Malaysian Patent Application No. PI 2016702723, Office Action dated Jul. 24, 2019, 4 pages.

* cited by examiner

POWER ADAPTER AND METHOD FOR HANDLING IMPEDANCE ANOMALY IN CHARGING LOOP

CROSS-REFERENCE TO RELATED APPLICATIONS

This application is a continuation application of U.S. national phase application Ser. No. 15/115,078 filed on Jul. 28, 2016, which is based on International Application No. PCT/CN2015/070461, filed on Jan. 9, 2015, which is based on and claims priority to Chinese Patent Application Nos. 201410043148.3, 201410042716.8, both filed on Jan. 28, 2014, the entire contents of which are incorporated herein by reference.

TECHNICAL FIELD

Embodiments of the present disclosure relate to the charging technical field, and more particularly, to a power adapter and a method for handling an impedance anomaly in a charging loop.

BACKGROUND

Currently, batteries in most of electronic devices are connected with external power adapters via charging interfaces of the electronic devices to realize charging.

During the charging, an impedance of the charging loop may sometimes become abnormal. There are various reasons resulting in the impedance anomaly, such as, a loose contact due to a bad-inserted charging interface, a loose contact between a battery and a connector located at two ends of the battery due to dirt at the two ends of the battery.

In a case that the impedance of the charging loop is abnormal, if the charging is still performed, charging components (such as a battery, a power adapter, and a terminal) will be damaged, thus bringing a hidden danger. In the related art, the impedance anomaly in the charging loop cannot be detected and handled, such that the safety during the charging is poor.

DISCLOSURE

Embodiments of the present disclosure provide a power adapter and a method for handling an impedance anomaly in a charging loop.

In at least one embodiment, a power adapter is provided, including a power conversion unit and a charging interface. The power conversion unit is configured to form a charging loop with a terminal via the charging interface so as to charge a battery of the terminal. The power adapter further includes: a communication unit, configured to receive voltage indicative information from the terminal when the power adapter charges the terminal, in which the voltage indicative information indicates an input voltage of the terminal from the power adapter detected by the terminal; a detection unit, configured to detect an output voltage of the power adapter; and an anomaly handling unit, configured to determine, according to a difference between the input voltage and the output voltage, whether an impedance of the charging loop is abnormal, and to control the charging loop to enter into a protection state if the impedance of the charging loop is abnormal. The communication unit is configured to send charging protection indicative information to the terminal when the impedance of the charging loop is abnormal, in which the charging protection indicative information is configured to indicate the terminal to control the charging loop to enter into the protection state.

In at least one embodiment, a method for handling an impedance anomaly in a charging loop is provided, including: determining whether the charging loop between the power adapter and a terminal is abnormal when the power adapter charges a battery of the terminal; controlling the charging loop to enter into a protection state when an impedance of the charging loop is abnormal; and sending charging protection indicative information to the terminal when the impedance of the charging loop is abnormal, the charging protection indicative information being configured to indicate the terminal to control the charging loop to enter into the protection state.

In at least one embodiment, a method for handling an impedance anomaly in a charging loop is provided, including: receiving, by a power adapter, voltage indicative information from a terminal when the power adapter charges the battery, in which the voltage indicative information indicates an input voltage of the terminal from the power adapter detected by the terminal; detecting, by the power adapter, an output voltage of the power adapter; and determining, by the power adapter according to a difference between the input voltage and the output voltage, whether an impedance of the charging loop is abnormal; and controlling, by the power adapter, the charging loop to enter into a protection state if the impedance of the charging loop is abnormal, including sending, by the power adapter, charging protection indicative information to the terminal when the impedance of the charging loop is abnormal, so as to indicate the terminal to control the charging loop to enter into the protection state.

BRIEF DESCRIPTION OF THE DRAWINGS

In order to make the technical solutions of embodiments of the present disclosure more clearly, the accompanying drawings used in the description of embodiments of the present disclosure are briefly described hereunder. Obviously, the described drawings are merely some embodiments of present disclosure. For those skilled in the art, other drawings can be obtained based on these drawings without any creative work.

DETAILED DESCRIPTION

The technical solutions in embodiments of the present disclosure are hereinafter described clearly and completely with reference to the accompanying drawings in embodiments of the present disclosure as follows. Apparently, the described embodiments are merely a part of embodiments of the present disclosure, rather than all embodiments of the present disclosure. All other embodiments obtained by those skilled in the art based on embodiments of the present disclosure without creative efforts shall fall within the protection scope of the present disclosure.

Figure 1:
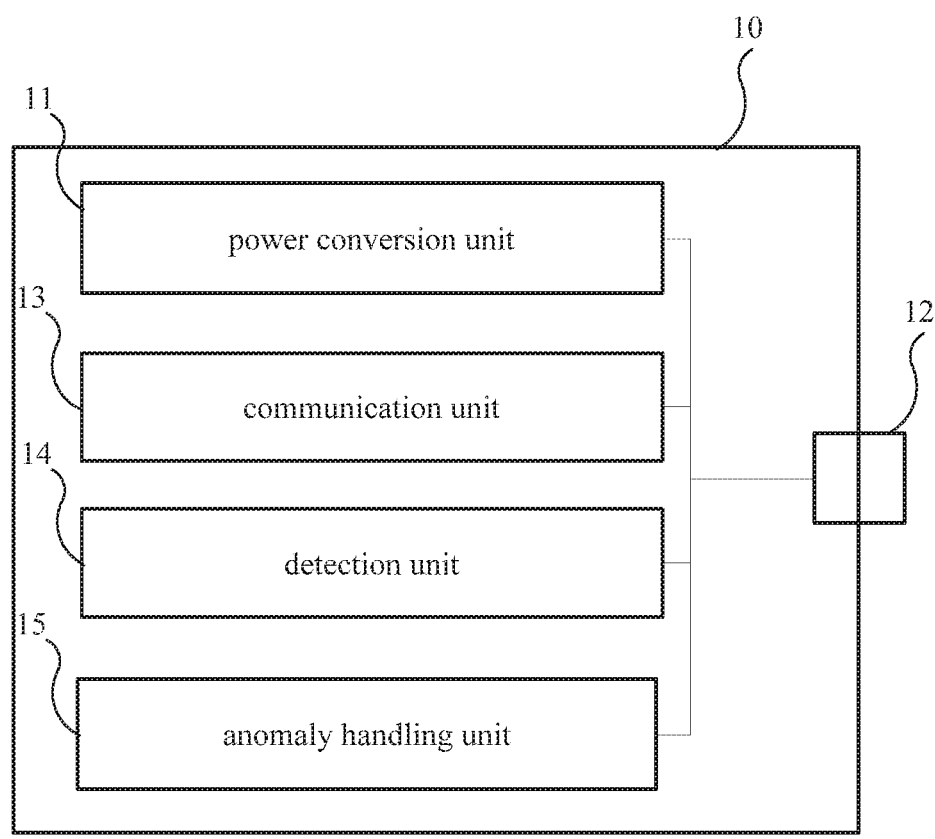
FIG. 1 is a schematic block diagram showing a power adapter according to an embodiment of the present disclosure.

FIG. 1 is a schematic block diagram showing a power adapter according to an embodiment of the present disclosure. The power adapter 10 shown in FIG. 1 includes: a power conversion unit 11 and a charging interface 12. The power conversion unit 11 is configured to form a charging loop with a terminal via the charging interface 12, so as to charge a battery of the terminal. The power adapter 10 further includes a communication unit 13, a detection unit 14 and an anomaly handling unit 15.

The communication unit 13 is configured to receive voltage indicative information from the terminal when the power adapter 10 charges the terminal, in which the voltage indicative information indicates an input voltage of the terminal from the power adapter 10 detected by the terminal.

The detection unit 14 is configured to detect an output voltage of the power adapter 10.

The anomaly handling unit 15 is configured to determine, according to a difference between the input voltage and the output voltage, whether an impedance of the charging loop is abnormal, and to control the charging loop to enter into a protection state if the impedance of the charging loop is abnormal.

In embodiments of the present disclosure, the power adapter 10 acquires the input voltage of the terminal from the power adapter 10 detected by the terminal via a communication with the terminal, the power adapter 10 determines based on the difference between the output voltage of the power adapter 10 detected by itself and the input voltage of the terminal from the power adapter 10 detected by the terminal whether the impedance of the charging loop is abnormal and controls the charging loop to enter into the protection state if the impedance of the charging loop is abnormal, such that the safety during the charging is improved.

In at least one embodiment, the above anomaly handling unit 15 controlling the charging loop to enter into the protection state can include: reducing by the anomaly handling unit 15 the output voltage of the power adapter 10; reducing by the anomaly handling unit 15 output current of the power adapter 10; or disconnecting by the anomaly handling unit 15 the charging loop.

In at least one embodiment, the above anomaly handling unit 15 is configured to: determine a level of the impedance according to the difference; and control, according to the level of the impedance, the charging loop to enter into a protection state corresponding to the level.

For example, a correspondence between the level of impedance and the difference between the input voltage of the terminal from the power adapter 10 and the output voltage of the power adapter 10 can be preset. After determining an actual difference between the input voltage of the terminal from the power adapter 10 and the output voltage of the power adapter 10, the anomaly handling unit 15 can find the level of impedance corresponding to the actual difference based on the above correspondence. Each level of impedance corresponds to a distinct protection state. For example, the level of impedance can be divided into "light", "middle" and "heavy". If the level of impedance is "light", it can control the charging loop to continue to charge with large current. If the level of impedance is "middle", it can control the charging loop to charge with small current. If the level of impedance is "heavy", it can control the charging loop to be turned off.

In at least one embodiment, a position where the output voltage is detected by the power adapter 10 and a position where the input voltage of the terminal from the power adapter 10 is detected by the terminal are not limited herein, and can be determined according to different demands.

For example, the detection positions of the input voltage of the terminal from the power adapter 10 and the output voltage of the power adapter 10 can be located at two ends of the charging interface 12 respectively, and the impedance of the charging loop refers to an impedance of a circuit in the charging interface 12. It should be understood that, the above detection positions of the input voltage of the terminal from the power adapter 10 and the output voltage of the power adapter 10 being located at two ends of the charging interface 12 respectively means that, the terminal detects the input voltage of the terminal from the power adapter 10 at one side of the charging interface 12, and the power adapter 10 detects the output voltage of the power adapter 10 at the other side of the charging interface 12. The above detection positions of the input voltage of the terminal from the power adapter 10 and the output voltage of the power adapter 10 being located at two ends of the charging interface 12 respectively means that, the position where the power adapter 10 detects the output voltage and the position where the terminal detects the input voltage of the terminal from the power adapter 10 are close to the charging interface 12 connected thereto, if the voltage drop of any one of the voltages detected by the terminal and the power adapter 10 is abnormal, it can be determined that this happens due to the impedance anomaly of the circuit in the charging interface 12.

For another example, the detection position of the input voltage of the terminal from the power adapter 10 is located at two ends of the battery, and the impedance of the charging loop refers to an impedance of a circuit from the power adapter 10 to the battery of the terminal. Since the input current of the power adapter 10 finally reaches the two ends of the battery after flowing through various components in the terminal, when the terminal detects the input voltage of the terminal from the power adapter 10 at the two ends of the battery, the difference between the input voltage of the terminal from the power adapter 10 and the output voltage of the power adapter 10 can indicate the impedance of the whole charging loop.

Figure 2:
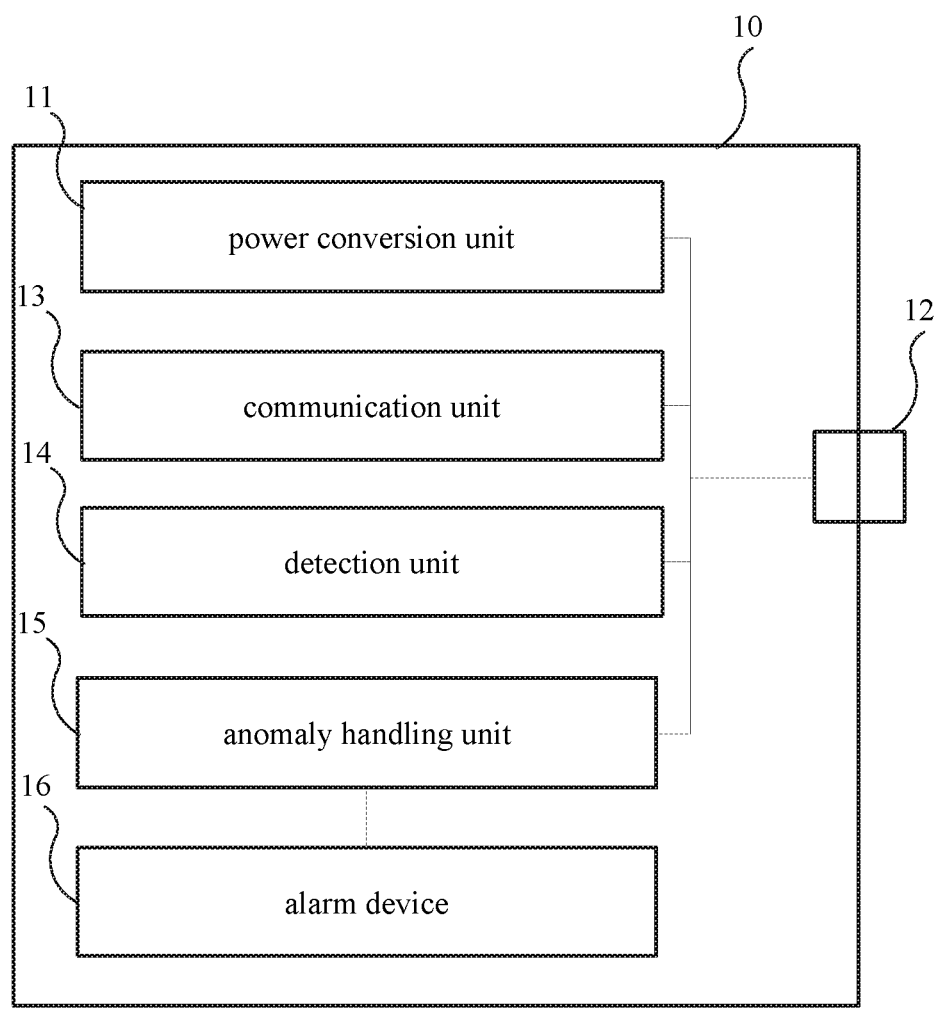
FIG. 2 is a schematic block diagram showing a power adapter according to an embodiment of the present disclosure.

In at least one embodiment, as shown in FIG. 2, the power adapter 10 further includes: an alarm device 16, configured to generate an alarm signal if the impedance of the charging loop is abnormal. The alarm device 16 can be a sound alarm device or a lamp. Taking the impedance of the charging loop being the impedance of the circuit in the charging interface 12 as an example, when the alarm device 16 raises an alarm, it means that the charging interface 12 has a loose contact, such that a user is reminded to re-connect the charging interface 12 between the power adapter 10 and the terminal.

In at least one embodiment, if the impedance of the charging loop is abnormal, the communication unit 13 is configured to send charging protection indicative information to the terminal, so as to indicate the terminal to control the charging loop to enter into the protection state.

In embodiments of the present disclosure, if the impedance of the charging loop is abnormal, the power adapter 10 not only controls the charging loop to enter into the protection state, but also notices the terminal to control the charging loop to enter into the protection state. In this way, even if the anomaly handing unit 15 in the power adapter 10 loses efficacy and the power adapter 10 cannot control the charging loop to enter into the protection state, the terminal can control the charging loop to enter into the protection state, thus further improving the safety during the charging.

Figure 3:
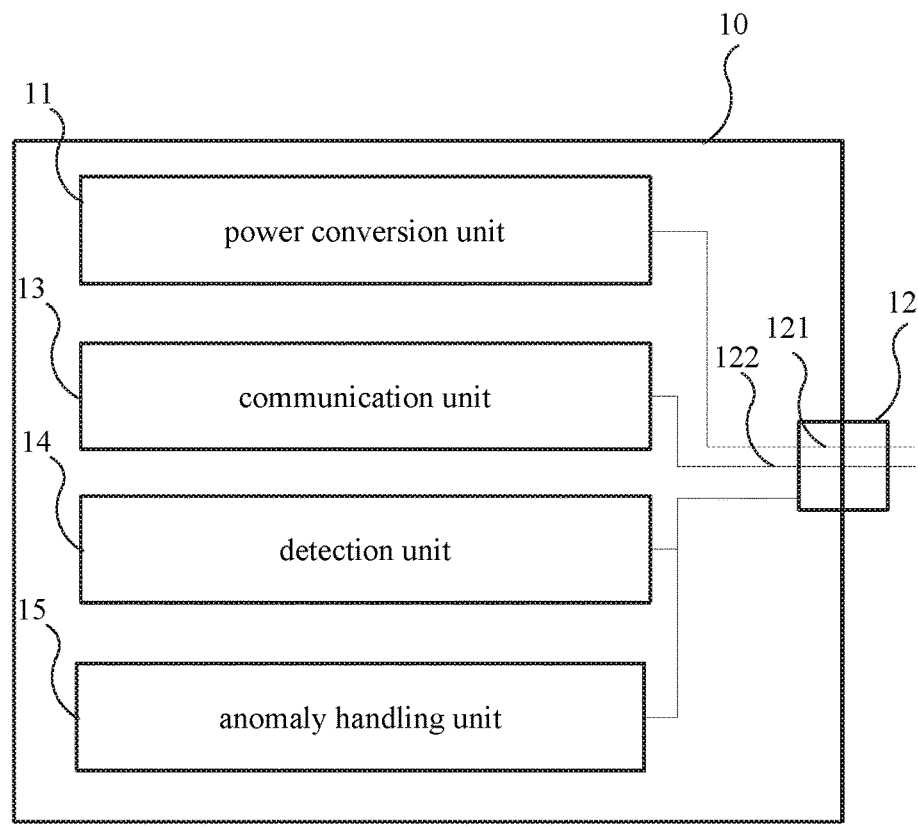
FIG. 3 is a schematic block diagram showing a power adapter according to an embodiment of the present disclosure.

In at least one embodiment, as shown in FIG. 3, the charging interface 12 includes a power wire 121 and a data wire 122. The power conversion unit 11 is configured to form the charging loop with the terminal via the power wire 121 in the charging interface 12 so as to charge the battery of the terminal. The communication unit 13 is configured to receive the voltage indicative information from the terminal via the data wire 122 in the charging interface 12.

For example, the charging interface 12 may be a USB (Universal Serial Bus) interface or a micro USB interface. The power wire in the USB interface may include a +5V power wire and a −5V power wire. The data wire in the USB interface may include a D+ wire and a D− wire.

Figure 4:
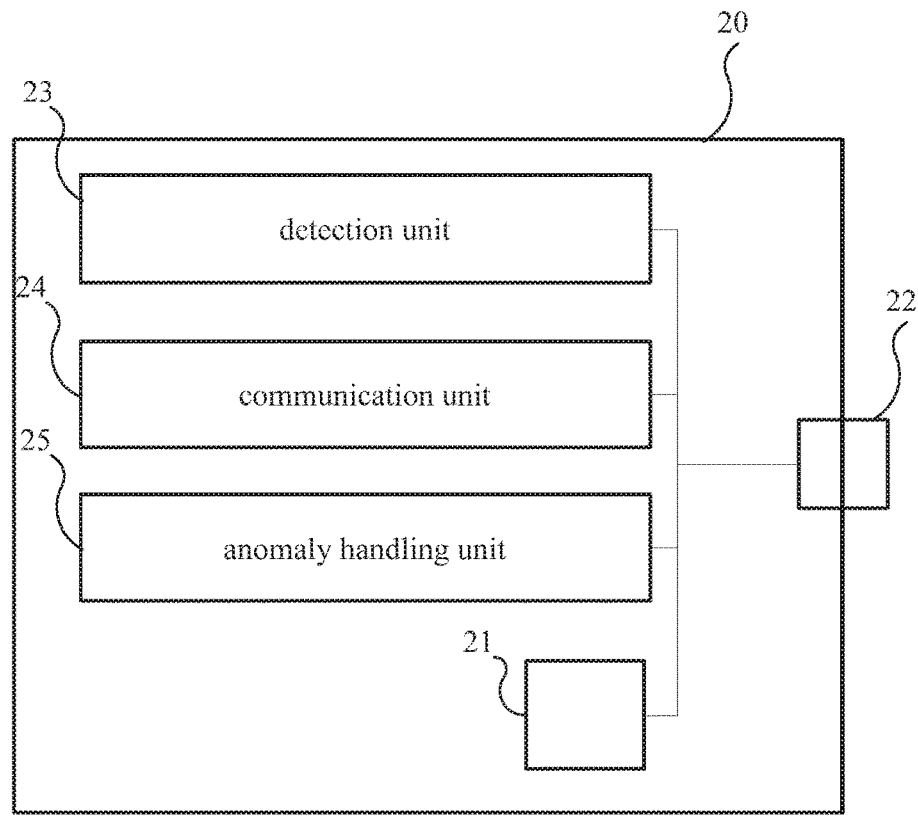
FIG. 4 is a schematic block diagram showing a terminal according to an embodiment of the present disclosure.

FIG. 4 is a schematic block diagram showing a terminal according to an embodiment of the present disclosure. The terminal 20 shown in FIG. 4 includes a battery 21 and a charging interface 22. The terminal 20 is configured to form a charging loop with a power adapter via the charging interface 22, so as to charge the battery 21. The terminal 20 further includes: a detection unit 23, a communication unit 24 and an anomaly handling unit 25.

The detection unit 23 is configured to detect an input voltage of the terminal 20 from the power adapter when the power adapter charges the terminal 20.

The communication unit 24 is configured to send voltage indicative information to the power adapter, in which the voltage indicative information indicates the input voltage of the terminal 20 from the power adapter detected by the detection unit 23.

The communication unit 24 is configured to receive charging protection indicative information from the power adapter if the power adapter determines based on a difference between an output voltage of the power adapter and the input voltage of the terminal 20 from the power adapter that an impedance of the charging loop is abnormal.

The anomaly handing unit 25 is configured to control the charging loop to enter into a protection state according to an indication of the charging protection indicative information.

In embodiments of the present disclosure, the terminal 20 communicates with the power adapter during the charging and sends the input voltage of the terminal 20 from the power adapter detected by it, such that the power adapter determines according to the difference between the input voltage and the output voltage whether the impedance of the charging loop is abnormal. If the impedance of the charging loop is abnormal, the terminal 20 receives the charging protection indicative information from the power adapter, and then controls the charging loop to enter into the protection state, thus improving the safety during the charging.

Figure 5:
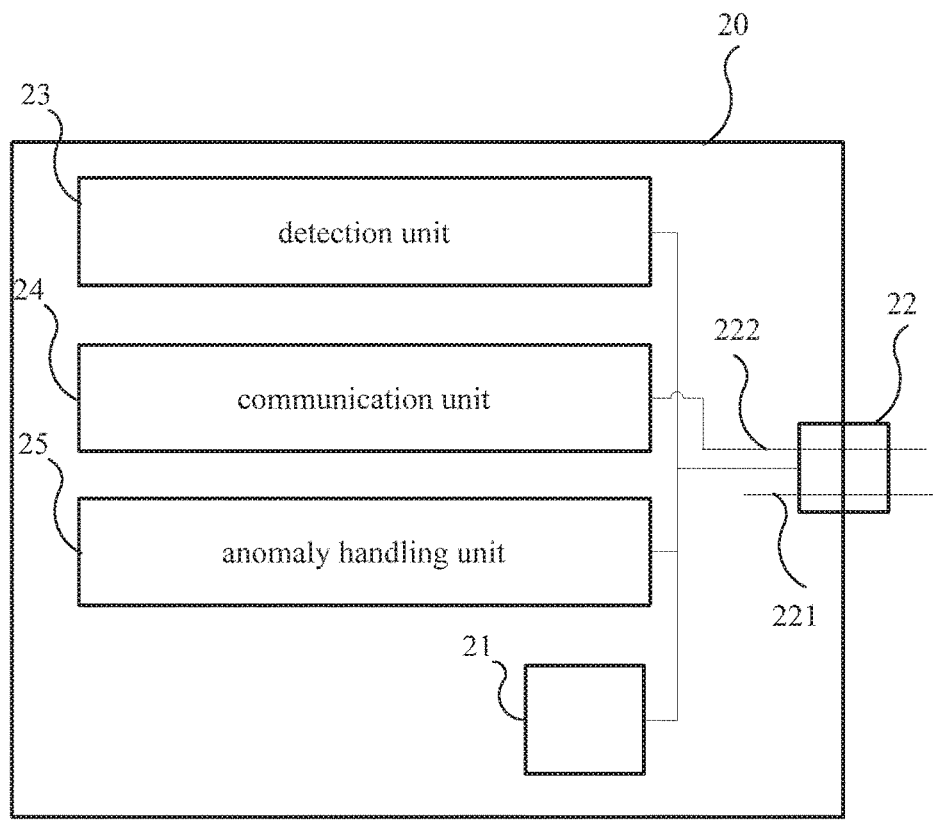
FIG. 5 is a schematic block diagram showing a terminal according to an embodiment of the present disclosure.

In at least one embodiment, as shown in FIG. 5, the charging interface 22 can include a power wire 221 and a data wire 222. The terminal 20 is configured to form the charging loop with the power adapter via the power wire 221 in the charging interface 22 so as to charge the battery 21. The communication unit 24 is configured to send the voltage indicative information to the power adapter via the date wire 222 in the charging interface 22.

For example, the charging interface 22 may be a USB (Universal Serial Bus) interface or a micro USB interface. The power wire 221 in the USB interface may include a +5V power wire and a −5V power wire. The data wire 222 in the USB interface may include a D+ wire and a D− wire.

In at least one embodiment, a position where the output voltage is detected by the power adapter and a position where the input voltage of the terminal 20 from the power adapter is detected by the terminal 20 are not limited herein, and can be determined according to different demands.

For example, the detection positions of the input voltage of the terminal 20 from the power adapter and the output voltage of the power adapter can be located at two ends of the charging interface 22 respectively, and the impedance of the charging loop refers to an impedance of a circuit in the charging interface 22. The above detection positions of the input voltage of the terminal 20 from the power adapter and the output voltage of the power adapter being located at two ends of the charging interface 22 respectively means that, the position where the power adapter detects the output voltage and the position where the terminal 20 detects the input voltage of the terminal 20 from the power adapter are close to the charging interface 22 connected thereto, if the voltage drop of any one of the voltages detected by the terminal 20 and the power adapter is abnormal, it can be determined that this happens due to the impedance anomaly of the circuit in the charging interface 22.

For another example, the detection position of the input voltage of the terminal 20 from the power adapter is located at two ends of the battery 21, and the impedance of the charging loop refers to an impedance of a circuit from the power adapter to the battery 21 of the terminal 20. Since the input current of the power adapter finally reaches the two ends of the battery 21 after flowing through various components in the terminal 20, when the terminal 20 detects the input voltage of the terminal 20 from the power adapter at the two ends of the battery 21, the difference between the input voltage of the terminal 20 from the power adapter and the output voltage of the power adapter can indicate the impedance of the whole charging loop.

Figure 6:
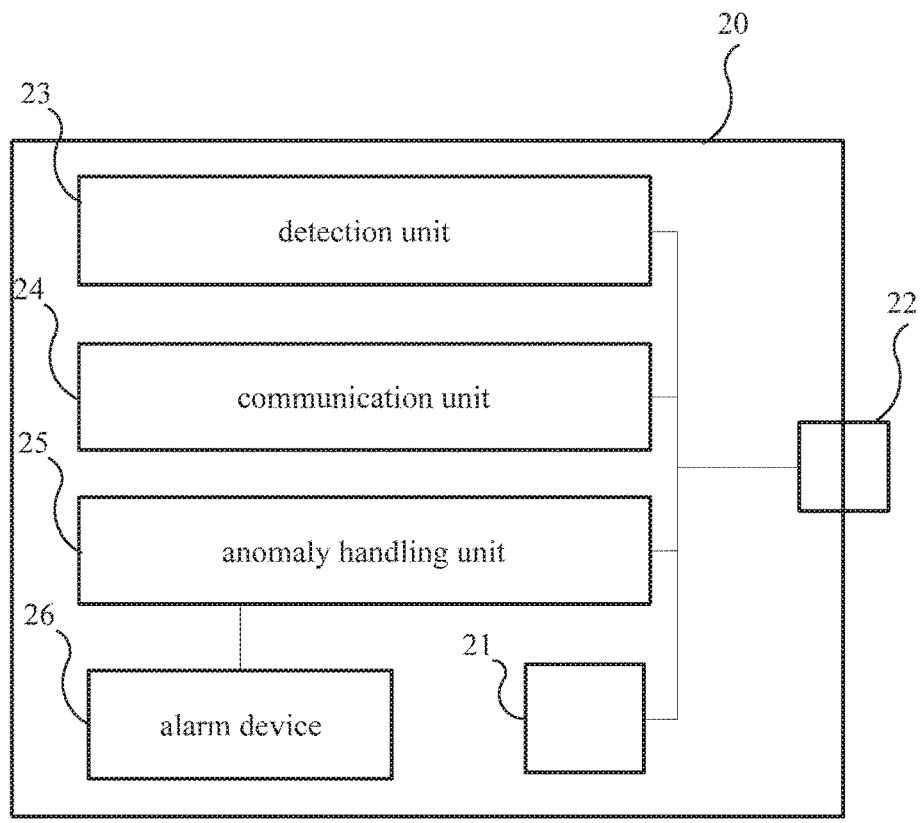
FIG. 6 is a schematic block diagram showing a terminal according to an embodiment of the present disclosure.

In at least one embodiment, as shown in FIG. 6, the terminal 20 further includes: an alarm device 26, configured to generate an alarm signal if the impedance of the charging loop is abnormal. The alarm device 26 can be a sound alarm device or a lamp. Taking the impedance of the charging loop being the impedance of the circuit in the charging interface 22 as an example, when the alarm device 26 raises an alarm, it means that the charging interface 22 has a loose contact, such that a user is reminded to re-connect the charging interface 22 between the power adapter and the terminal 20.

Figure 7:
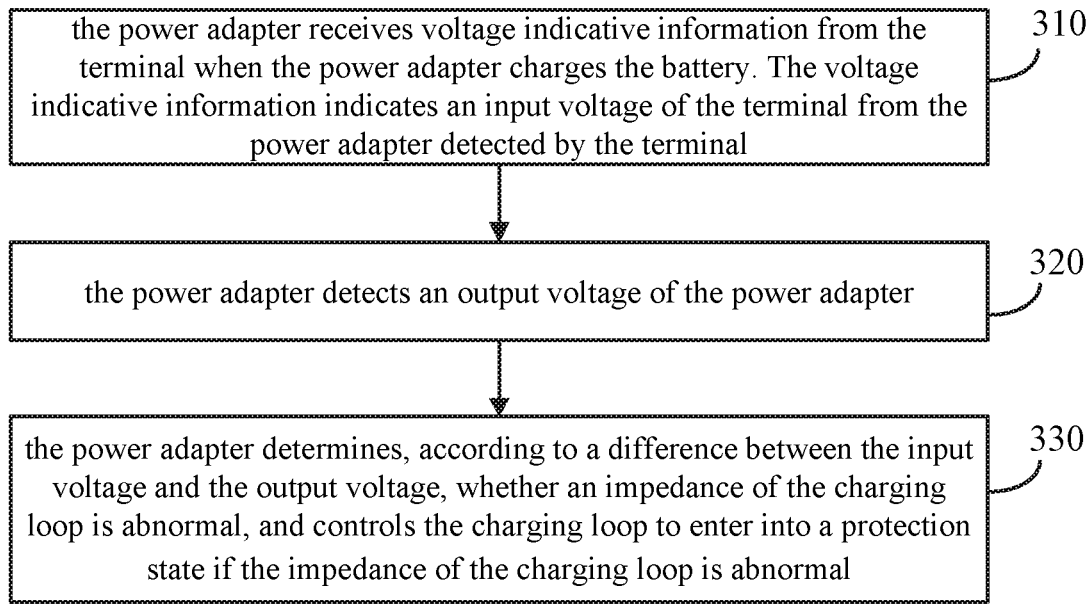
FIG. 7 is a schematic flow chart showing a method for handling an impedance anomaly in a charging loop according to an embodiment of the present disclosure.

FIG. 7 is a schematic flow chart showing a method for handling an impedance anomaly in a charging loop according to an embodiment of the present disclosure. The method shown in FIG. 7 can be executed by the power adapter shown in FIG. 1, 2 or 3, which is not described herein to avoid needless duplication. The method in FIG. 7 includes the following blocks.

In block 310, the power adapter receives voltage indicative information from the terminal when the power adapter charges the battery. The voltage indicative information indicates an input voltage of the terminal from the power adapter detected by the terminal.

In block 320, the power adapter detects an output voltage of the power adapter.

In block 330, the power adapter determines, according to a difference between the input voltage and the output voltage, whether an impedance of the charging loop is abnormal, and controls the charging loop to enter into a protection state if the impedance of the charging loop is abnormal.

In embodiments of the present disclosure, the power adapter acquires the input voltage of the terminal from the power adapter detected by the terminal via a communication with the terminal, the power adapter determines based on the difference between the output voltage of the power adapter detected by itself and the input voltage of the terminal from the power adapter detected by the terminal whether the impedance of the charging loop is abnormal and controls the charging loop to enter into the protection state if the impedance of the charging loop is abnormal, such that the safety during the charging is improved.

In at least one embodiment, determining, by the power adapter according to the difference between the input voltage and the output voltage, whether the impedance of the charging loop is abnormal, and controlling, by the power adapter, the charging loop to enter into the protection state if the impedance of the charging loop is abnormal can include: determining, by the power adapter according to the difference between the input voltage and the output voltage, a level of the impedance of the charging loop; and controlling, by the power adapter according to the level of the impedance, the charging loop to enter into a protection state corresponding to the level.

In at least one embodiment, the power adapter charges the terminal via a charging interface, and detection positions of the input voltage of the terminal from the power adapter and the output voltage of the power adapter are located at two ends of the charging interface, and the impedance of the charging loop refers to an impedance of a circuit in the charging interface.

In at least one embodiment, the detection position of the input voltage of the terminal from the power adapter is located at two ends of the battery, and the impedance of the charging loop refers to an impedance of a circuit from the power adapter to the battery of the terminal.

In at least one embodiment, the method shown in FIG. 3 further includes: generating, by the power adapter, an alarm signal indicating that the impedance of the charging loop is abnormal.

In at least one embodiment, the method shown in FIG. 3 further includes: sending, by the power adapter, charging protection indicative information to the terminal if the impedance of the charging loop is abnormal, so as to indicate the terminal to control the charging loop to enter into the protection state.

In at least one embodiment, the power adapter charges the terminal via a charging interface. The charging interface includes a power wire and a data wire. The power adapter charges the terminal via the power wire in the charging interface. Receiving, by the power adapter, the voltage indicative information from the terminal can include: receiving, by the power adapter, the voltage indicative information from the terminal via the data wire in the charging interface.

Figure 8:
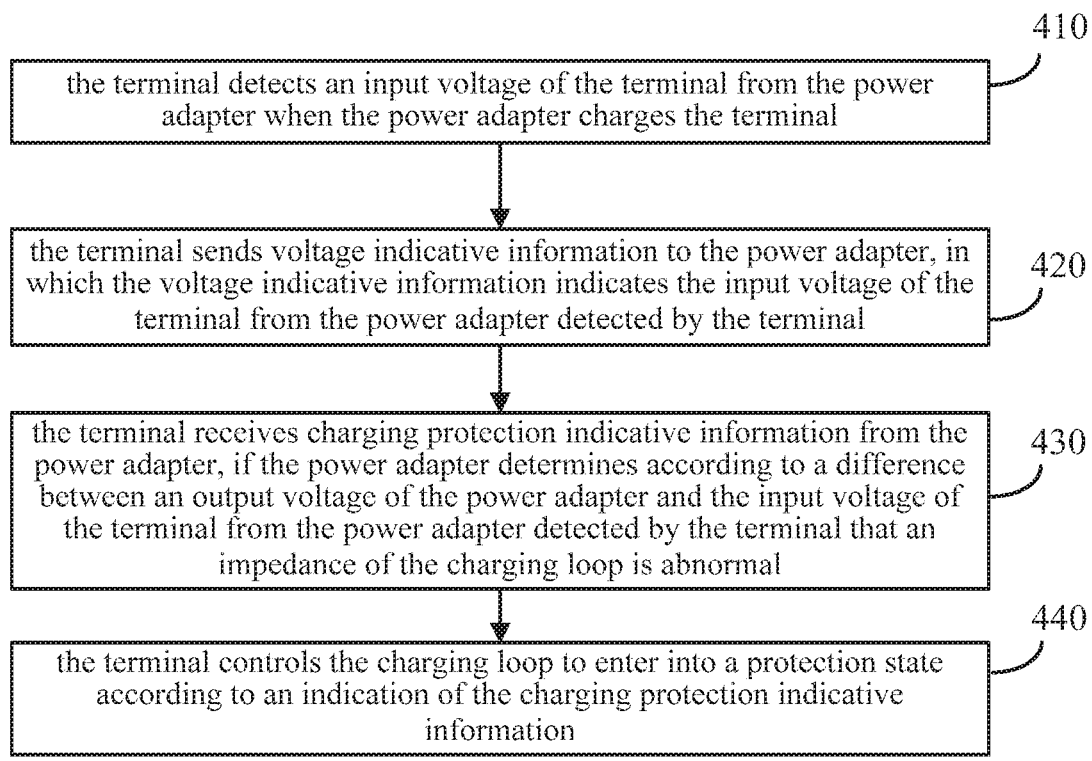
FIG. 8 is a schematic flow chart showing a method for handling an impedance anomaly in a charging loop according to an embodiment of the present disclosure.

FIG. 8 is a schematic flow chart showing a method for handling an impedance anomaly in a charging loop according to an embodiment of the present disclosure. The method shown in FIG. 8 can be executed by the terminal shown in FIG. 4, 5 or 6, which is not described herein to avoid needless duplication. The method in FIG. 8 includes the following blocks.

In block 410, the terminal detects an input voltage of the terminal from the power adapter when the power adapter charges the terminal.

In block 420, the terminal sends voltage indicative information to the power adapter, in which the voltage indicative information indicates the input voltage of the terminal from the power adapter detected by the terminal.

In block 430, the terminal receives charging protection indicative information from the power adapter, if the power adapter determines according to a difference between an output voltage of the power adapter and the input voltage of the terminal from the power adapter detected by the terminal that an impedance of the charging loop is abnormal.

In block 440, the terminal controls the charging loop to enter into a protection state according to an indication of the charging protection indicative information.

In embodiments of the present disclosure, the terminal communicates with the power adapter during the charging and sends the input voltage of the terminal from the power adapter detected by it, such that the power adapter determines according to the difference between the input voltage and the output voltage whether the impedance of the charging loop is abnormal. If the impedance of the charging loop is abnormal, the terminal receives the charging protection indicative information from the power adapter, and then controls the charging loop to enter into the protection state, thus improving the safety during the charging.

In at least one embodiment, a charging interface can include a power wire and a data wire. The power adapter charges the terminal via the power wire in the charging interface. Sending, by the terminal, the voltage indicative information to the power adapter can include: sending, by the terminal, the voltage indicative information to the power adapter via the data wire in the charging interface.

In at least one embodiment, detection positions of the input voltage of the terminal from the power adapter and the output voltage of the power adapter are located at two ends of the charging interface, and the impedance of the charging loop refers to an impedance of a circuit in the charging interface.

In at least one embodiment, the detection position of the input voltage of the terminal from the power adapter is located at two ends of the battery, and the impedance of the charging loop refers to an impedance of a circuit from the power adapter to the battery of the terminal.

In at least one embodiment, the method shown in FIG. 4 further includes: generating, by the terminal, an alarm signal, if the impedance of the charging loop is abnormal.

Those skilled in the art can be aware that, in combination with the examples described in the embodiments disclosed in this specification, units and algorithm blocks can be implemented by electronic hardware, or a combination of computer software and electronic hardware. Whether the functions are executed by hardware or software depends on particular applications and design constraint conditions of the technical solutions. Those skilled in the art can use different methods to implement the described functions for each particular application, but it should not be considered that the implementation goes beyond the scope of the present disclosure.

It would be appreciated by those skilled in the art that, for the purpose of simplification convenience of description, concerning the specific working process of the above system, device and unit as described above, reference is made to the method embodiments of the present disclosure, which will not be elaborated herein.

In several embodiments provided in the application, it should be understood that the disclosed system, device and method can be realized by other manners. For example, the above-described embodiments are only exemplary; for example, the division of said unit is only a logic function division; there can be additional dividing manners during the actual implementation. For example, multiple units or components can be combined or integrated into another system, or some features can be ignored, or not implemented. Another point, the displayed or discussed mutual coupling or direct coupling or communication connection can be indirect coupling or communication connection of devices or units via some interfaces, in electronic, mechanical, or other forms.

Said unit described as a separation part can be or can not be separated physically; the part displayed as a unit can be or can not be a physical unit, namely it can be located in one place, or can be distributed to multiple network units. Part or all of the units can be selected according to actual needs to achieve the purpose of the embodiment.

In addition, all functional units in the embodiments of the disclosure can be integrated in one processing unit, or each unit exists individually in physical form, or two or more units are integrated in one unit.

If said function is realized in the form of software function unit and sold or used as an independent product, it can be stored in a computer readable storage medium. With such an understanding, the technical solution of the disclosure substantially or its portion that contributes to the prior art or a portion of the technical solution can embody in the form of a computer software product which is stored in a memory media, including a plurality of instructions such that a computer (can be a personal computer, a server, or a network device, etc.) executes all or some blocks of the methods described in each of all the embodiments. And the previously mentioned memory media include such media capable of storing program codes as USB flash disk, portable hard drive, read-only memory (ROM), random access memory (RAM), floppy disk or compact disk.

The above descriptions are only specific embodiments of the disclosure, but not intended to limit the protection scope of the disclosure. The variation or replacement easily thought of by those skilled in the art within the technical scope disclosed by the disclosure, shall fall within the protection scope of the disclosure. Therefore, the protection scope of the disclosure shall be determined with reference to the protection scope of the claims.

What is claimed is:

1. A power adapter, comprising a power conversion unit and a charging interface, the power conversion unit being configured to form a charging loop with a terminal via the charging interface so as to charge a battery of the terminal, and wherein, the power adapter further comprises:
   a communication unit, configured to receive voltage indicative information from the terminal when the power adapter charges the terminal, wherein the voltage indicative information indicates an input voltage of the terminal from the power adapter detected by the terminal;
   a detection unit, configured to detect an output voltage of the power adapter; and
   an anomaly handling unit, configured to determine, according to a difference between the input voltage and the output voltage, whether an impedance of the charging loop is abnormal, and to control the charging loop to enter into a protection state if the impedance of the charging loop is abnormal,
   wherein, the communication unit is configured to send charging protection indicative information to the terminal when the impedance of the charging loop is abnormal, the charging protection indicative information being configured to indicate the terminal to control the charging loop to enter into the protection state.

2. The power adapter according to claim 1, wherein, the anomaly handling unit is configured to:
   determine a level of the impedance according to the difference; and
   control, according to the level of the impedance, the charging loop to enter into a protection state corresponding to the level.

3. The power adapter according to claim 1, wherein, detection positions of the input voltage of the terminal from the power adapter and the output voltage of the power adapter are located at two ends of the charging interface respectively, and the impedance of the charging loop refers to an impedance of a circuit in the charging interface.

4. The power adapter according to claim 1, wherein, a detection position of the input voltage of the terminal from the power adapter is located at two ends of the battery of the terminal, and the impedance of the charging loop refers to an impedance of a circuit from the power adapter to the battery of the terminal.

5. The power adapter according to claim 1, further comprising:
   an alarm device, configured to generate an alarm signal if the impedance of the charging loop is abnormal.

6. The power adapter according to claim 1, wherein, the charging interface comprises a power wire and a data wire;
   the power conversion unit is configured to:
   form the charging loop with the terminal via the power wire in the charging interface, so as to charge the battery of the terminal; and
   the communication unit is configured to:
   receive the voltage indicative information from the terminal via the data wire in the charging interface.

7. The power adapter according to claim 6, wherein the detection unit is configured to detect the output voltage at the charging interface of the power adapter.

8. The power adapter according to claim 7, wherein the input voltage is detected at the charging interface of the terminal; and
   the anomaly handling unit is configured to determine the impedance of the charging loop is abnormal when a voltage drop between the input voltage and the output voltage is abnormal.

9. A method for handling an impedance anomaly in a charging loop, applicable to a power adapter, comprising:
   determining whether an impedance of the charging loop between the power adapter and a terminal is abnormal when the power adapter charges a battery of the terminal;
   controlling the charging loop to enter into a protection state when the impedance of the charging loop is abnormal; and
   sending charging protection indicative information to the terminal when the impedance of the charging loop is abnormal, the charging protection indicative information being configured to indicate the terminal to control the charging loop to enter into the protection state.

10. The method according to claim 9, wherein controlling the charging loop to enter into the protection state comprises at least one of:
    reducing a current in the charging loop, and disconnecting the charging loop.

11. The method according to claim 9, further comprising:
    receiving, from the terminal, voltage indicative information being configured to indicate an input voltage detected by the terminal;
    acquiring an output voltage of the power adapter; and
    determining whether the impedance of the charging loop is abnormal according to the input voltage and the output voltage.

12. The method according to claim 9, further comprising:
generating an alarm signal when the impedance of the charging loop is abnormal, the alarm signal being configured to remind a user to re-connect the power adapter and the terminal.

13. The method according to claim 9, wherein the output voltage is detected at a charging interface of the power adapter;
the input voltage is detected at a charging interface of the terminal;
determining whether the charging loop between the power adapter and the terminal is abnormal comprises:
determining the impedance of the charging loop is abnormal when a voltage drop between the input voltage and the output voltage is abnormal.

14. A method for handling an impedance anomaly in a charging loop, comprising:
receiving, by a power adapter, voltage indicative information from a terminal when the power adapter charges a battery, wherein the voltage indicative information indicates an input voltage of the terminal from the power adapter detected by the terminal;
detecting, by the power adapter, an output voltage of the power adapter; and
determining, by the power adapter according to a difference between the input voltage and the output voltage, whether an impedance of the charging loop is abnormal; and
controlling, by the power adapter, the charging loop to enter into a protection state when the impedance of the charging loop is abnormal, comprising:
sending, by the power adapter, charging protection indicative information to the terminal when the impedance of the charging loop is abnormal, so as to indicate the terminal to control the charging loop to enter into the protection state.

15. The method according to claim 14, wherein, determining, by the power adapter according to the difference between the input voltage and the output voltage, whether the impedance of the charging loop is abnormal; and controlling, by the power adapter, the charging loop to enter into the protection state if the impedance of the charging loop is abnormal, comprises:

determining, by the power adapter, a level of the impedance according to the difference; and
controlling, by the power adapter according to the level of the impedance, the charging loop to enter into a protection state corresponding to the level.

16. The method according to claim 14, wherein controlling the charging loop to enter into the protection state comprises at least one of:
reducing a current in the charging loop, and disconnecting the charging loop.

17. The method according to claim 14, wherein, a detection position of the input voltage of the terminal from the power adapter is located at two ends of the battery of the terminal, and the impedance of the charging loop refers to an impedance of a circuit from the power adapter to the battery of the terminal.

18. The method according to claim 14, wherein, further comprising:
generating, by the power adapter, an alarm signal when the impedance of the charging loop is abnormal, the alarm signal being configured to remind a user to re-connect the power adapter and the terminal.

19. The method according to claim 14, wherein, the power adapter charges the terminal via a charging interface,
the charging interface comprises a power wire and a data wire;
the power adapter charges the terminal via the power wire in the charging interface; and
receiving, by the power adapter, the voltage indicative information from the terminal comprises: receiving by the power adapter the voltage indicative information from the terminal via the data wire in the charging interface.

20. The method according to claim 14, wherein the output voltage is detected at a charging interface of the power adapter;
the input voltage is detected at a charging interface of the terminal;
determining whether the charging loop between the power adapter and the terminal is abnormal comprises:
determining the impedance of the charging loop is abnormal when a voltage drop between the input voltage and the output voltage is abnormal.

* * * * *